(No Model.)

W. B. TATRO.
FRICTION CLUTCH.

No. 260,253. Patented June 27, 1882.

ATTEST:
John Bickler
F. W. Hanaford

William B. Tatro,
INVENTOR.
By Worth Osgood,
ATTORNEY.

UNITED STATES PATENT OFFICE.

WILLIAM B. TATRO, OF HARTFORD, CONNECTICUT.

FRICTION-CLUTCH.

SPECIFICATION forming part of Letters Patent No. 260,253, dated June 27, 1882.

Application filed March 3, 1882. (No model.)

*To all whom it may concern:*

Be it known that I, WILLIAM B. TATRO, of Hartford, county of Hartford, and State of Connecticut, have invented certain new and useful Improvements in Friction-Clutches, of which the following is a full, clear, and exact description, reference being had to the accompanying drawings, and to the letters of reference marked thereon.

My invention has relation to that class of clutches designed for coupling two pulleys or spools, or a revolving shaft and pulley or drum, in such manner that the parts may be made to revolve together, or one part allowed to remain stationary or be reversed while the other continues in motion. This class of clutches is employed in connection with various mechanisms, as is well understood.

The object of my invention is to produce a simple, cheap, and effective clutch that may be employed for all the purposes of the class of devices to which it belongs, one not likely to get out of order, certain and instantaneous in its action, admitting of no loss of motion by slipping, not liable to stick or catch, and applicable alike for light or heavy work. To accomplish all of this, my improvements involve certain novel and useful peculiarities of construction, relative arrangements or combinations of parts, and principles of operation, all of which will be herein first fully described, and then pointed out in the claims.

Figure 1:
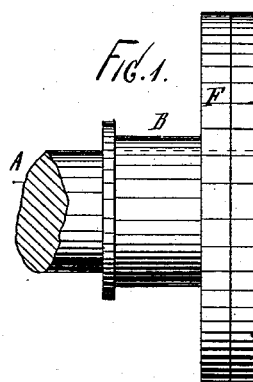
Figure 2:
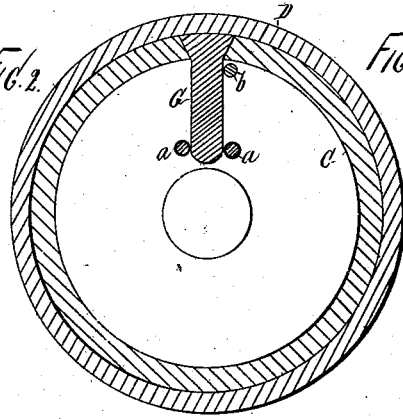
Figure 4:
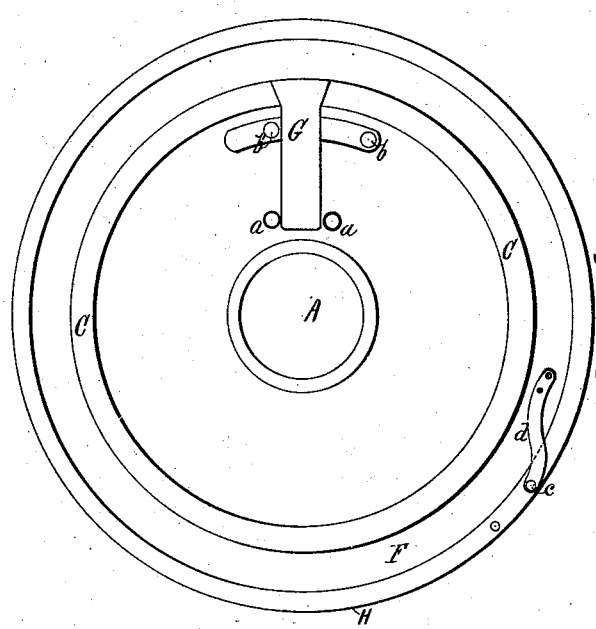
Figure 5:
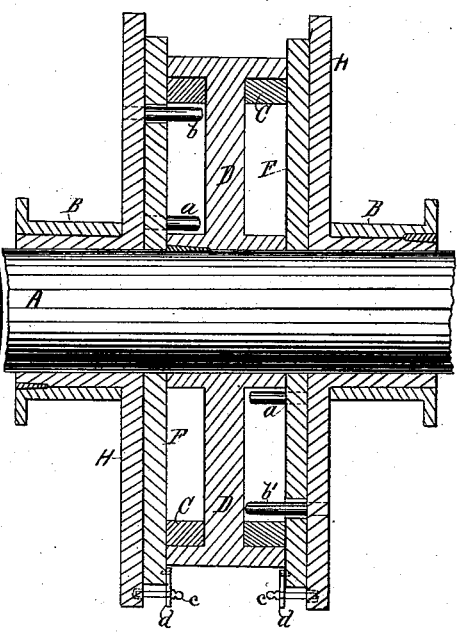

In the accompanying drawings, forming part of this specification, Figure 1 is an elevation of one form of clutch constructed in accordance with my invention; Fig. 2, a vertical section, and Fig. 3 an axial section, of the same, the clutch being arranged so that it will clutch only when the shaft or other part is moved in one direction. Fig. 4 is a plan view, showing in addition to devices of Figs. 1, 2, and 3 a shifting-plate and attached pins, whereby the clutching movement may be quickly and easily changed from one direction to another; and Fig. 5 is an axial section of a two-part or double clutch mounted upon a shaft, either of the parts being made to clutch in either direction, as may be desired.

In all these figures like letters of reference, wherever they occur, indicate corresponding parts.

A is a revolving shaft to which the clutch is to be applied, and B B are pulleys or spools, each connected with one part of the clutch. It may be desired to transmit motion from the shaft to the pulleys, or equivalents, or the reverse—viz., to transmit motion from the pulleys to the shaft—through the medium of the clutch, or to transfer motion and power from one side or part of the clutch to the other. In either case the clamping and holding properties of the improved device and the operations of its different parts are the same.

C is a split ring made to fit a recess in one side or part, D, of the clutch, the same being covered by the other side or part, F. Either part may be coupled with the shaft in any desired manner.

G is a lever, one end of which is located between the ends of the split ring and operating to crowd or spread the ring against the adjacent wall or flange. The split ring has before been known and used in clutches in connection with a spreading-lever. As heretofore arranged, the lever was liable to get out of place, its inner end being crowded past the shaft, and did not afford that instantaneous, powerful, and certain clamping effect much to be desired.

To prevent the lever from being withdrawn from between the ends of the split ring, the outer end of the lever is dovetailed, as shown, or cut in some equivalent form and made to fit between the ends of the spring, which are correspondingly shaped. It will be seen that by so forming the end of the lever it cannot be withdrawn from the opening in the ring when the two parts of the clutch are properly united, and, being so constructed and arranged, it is apparent that when the inner end of the lever is forced to one side or the other the dovetailed head not only crowds the two ends of the spring apart, but, in addition, is itself forced up against the wall of the clutch. The point of contact with the wall or flange affords an additional fulcrum or turning-point for the lever, and thus doubly insures the desired spreading of the ring and the resulting security of the clamp.

Upon one part, F, are secured two pins or projections, *a a*, so arranged as to practically touch the inner end of the lever G on opposite sides and at points near the location of the shaft, and a third pin or projection, *b*, is located near the ring C. When the part F is turned so as to make pin *b* bear against lever G the ring C is carried with it, and no clamping effects are produced; but the instant part F is revolved in the opposite direction one of the pins *a* is brought to bear against the opposite side of lever G, crowding the lever out of its radial line, and in consequence spreading the split ring and accomplishing the clutching. The pins are located close to the lever, so as to act against it instantaneously. Of course they would move the lever if not originally close to it, but would require time to reach their working-points, depending upon the distance they are compelled to travel. One pin, *a*, on one side and one, *b*, on the opposite side would accomplish the work of clutching and unclutching; but the two pins *a* are preferred, because they keep the lever in proper place and prevent its inner end from being crowded too far in either direction.

Figure 3:
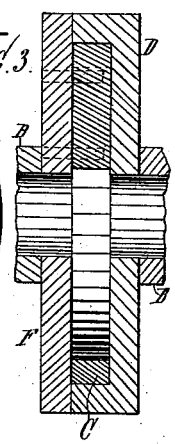

In respect to the single clutch shown in Figs. 1, 2, and 3, it is clear that if the pin *b* were shifted so as to fall upon the opposite side of lever G the action of the clutch would be precisely reversed.

If means be provided for transferring pin *b* from one side of lever G to the other, then the clutch can be made to work in either direction and changed from a right to a left clutch at pleasure—a feature of obvious utility.

The shifting may be accomplished in effect by the simple arrangement shown in Figs. 4 and 5, wherein two pins, *b* and *b'*, are connected with a turning-plate, H, located upon the cover F, said pins passing through a suitable slot in F and arranged to fall upon opposite sides of lever G, as shown in Fig. 4.

The parts F and H are secured together in any convenient manner, as by the key *c* and its controlling-spring *d*. By simply lifting this key *c* and turning plate H until the key engages with the next socket provided for it in plate H, the bearing against the outer end of lever G is shifted from one side to the other, as will be readily understood. In this form one of the pins *a a* is always ready to bear against the inner end of the lever, no matter in which direction the clutch may be turned.

Other means of shifting the outer bearings from one side of the lever to the other might be devised; but those shown are simple, easily operated, and are sufficient to illustrate the scope of my invention in this regard.

At Fig. 5 I have shown a double clutch or two clutches upon one shaft, both having all the features of the reversible clutch shown in Fig. 4. In this form the part D is made with two flanges or rims, instead of one, and is shown as being keyed to the shaft. This form of clutch may be used for a variety of purposes. For instance, either or both of the pulleys or their equivalents may be given an intermittent motion, or, at times, a motion in one direction and then in the opposite direction, in which case the shaft will be carried in the same uniform direction, and this affords a convenient medium by which to change a reciprocating into a rotary motion. In case one of the pulleys be driven more rapidly than the other, the slower will not retard the movements of the shaft.

In the double clutch it is preferred to locate the catches of the shifting plates so that they may be released simultaneously, in order to change the direction of the clutching action whenever desired.

Instead of being mounted upon a single shaft, the clutch may be employed to couple the adjacent ends of two independent shafts, and generally for all the purposes for which friction-clutches are designed.

It will be observed that the principles of operation above pointed out are applicable to light and delicate mechanism, as well as in the heaviest class of machines.

The improvements indicated are found in practice to admirably answer all the purposes and objects of the invention, as previously stated.

I do not desire to be understood as making any claim herein to a divided ring and operating-lever arranged to spread said ring against the wall of the clutch, when broadly considered. In former constructions involving the divided ring and spreading-lever the lever has been so formed as to be liable to be crowded out of place from between the ends of the ring—a disadvantage which is entirely obviated by my improved construction, as will readily appear from a consideration of the foregoing explanations.

Having now fully described my invention, what I claim as new, and desire to secure by Letters Patent, is—

1. In a friction-clutch of the character herein set forth, the operating-lever held in place by a dovetailed or beveled head located between the ends of the divided ring, and arranged to spread the ring against the wall of the clutch, substantially as and for the purposes set forth.

2. In combination with the operating-lever provided with a beveled or dovetailed head, arranged to spread the divided ring against the wall of the clutch, the two pins or projections for bearing against the free end and opposite sides of said lever, substantially as and for the purposes set forth.

3. In a friction-clutch of the character herein set forth, the combination, with the operating-lever arranged to spread the divided ring against the wall of the clutch, of adjustable pins or studs for bearing against either side of the free end of said lever, substantially as and for the purposes set forth.

4. In combination with the wall of the clutch, the movable plate bearing the two pins or studs which act upon either side of the free end of the operating-lever, the head of which is held between the ends of the divided ring, a spring-catch arranged to hold said plate in proper position upon the side of the clutch, substantially as and for the purposes set forth.

5. The herein-described double clutch having the two divided rings provided with spreading-levers, the heads of which are held between the ends of said rings, the pins or projections for bearing against the free ends of said levers, the movable or adjustable plates carrying said pins and serving to transfer the bearings from one side to the other of the free ends of the levers, the same being constructed and arranged to operate substantially as herein shown and described.

In testimony that I claim the foregoing I have hereunto set my hand in the presence of two witnesses.

WM. B. TATRO.

Witnesses:
F. W. HANAFORD,
WORTH OSGOOD.